United States Patent [19]

Davis et al.

[11] Patent Number: 5,770,834
[45] Date of Patent: Jun. 23, 1998

[54] ROBOT CONTROL SYSTEM AND METHOD FOR TIG WELDING

[75] Inventors: Patrick S. Davis, Fort Collins; Steven G. Carey, Bellvue, both of Colo.

[73] Assignee: ABB Flexible Automation, Inc., New Berlin, Wis.

[21] Appl. No.: 696,686

[22] Filed: Aug. 14, 1996

[51] Int. Cl.[6] .................................................. B23K 9/09
[52] U.S. Cl. .............................. 219/130.5; 219/125.1; 219/130.51; 219/137.71
[58] Field of Search .......................... 219/130.5, 60 A, 219/124.03, 125.1, 130.31, 130.32, 130.33, 137.71, 137 PS, 75, 130.51

[56] References Cited

U.S. PATENT DOCUMENTS

| | | | |
|---|---|---|---|
| 3,536,879 | 10/1970 | Hartsell, Jr. et al. | 219/60 A |
| 3,555,239 | 1/1971 | Kerth | 219/130.5 |
| 3,689,734 | 9/1972 | Burley et al. | 219/130.5 |
| 4,356,378 | 10/1982 | Cloos et al. | 219/124.1 |
| 4,390,954 | 6/1983 | Manning | 219/130.5 |
| 4,504,728 | 3/1985 | Ukai et al. | 219/125.1 |
| 4,613,743 | 9/1986 | Nied et al. | 219/130.21 |
| 4,628,180 | 12/1986 | Edberg | 219/130.5 |
| 4,645,901 | 2/1987 | Scholz et al. | 219/125.1 |
| 4,650,957 | 3/1987 | Cullen et al. | 219/124.03 |
| 4,821,202 | 4/1989 | Davis et al. | 364/477 |
| 4,952,773 | 8/1990 | Orsos et al. | 219/124.34 |
| 4,973,813 | 11/1990 | Mitchell | 219/109 |
| 5,233,158 | 8/1993 | Karakama et al. | 219/130.33 |
| 5,486,679 | 1/1996 | Hamura et al. | 219/130.5 |

*Primary Examiner*—Clifford C. Shaw
*Attorney, Agent, or Firm*—Godfrey & Kahn, S.C.

[57] ABSTRACT

A robot control system that includes a controller that is capable of controlling the current supplied to a current-controlled tool mounted on the robot. The controller is capable of accepting operator inputs and the robot is coupled in data communication to the controller. A tool which is controlled in at least one manner by electric current is mounted on the arm of the robot. The controller is coupled in data communication to a current source and is programmed to control the current supplied to the tool. The controller is also capable of receiving inputs from an operator and is capable of ramping the current supplied to the tool from an initial current level to an operator selected current level over an operator defined and inputted selected time. The controller can also ramp the current supplied to the tool from the selected current level to a third current level over a second operator selected and inputted time period.

13 Claims, 5 Drawing Sheets

ROBOT CONTROL SYSTEM AND METHOD FOR TIG WELDING

BACKGROUND OF THE INVENTION

The present invention relates to a system and method for controlling a robot. More specifically, the present invention relates to a method of, and system for, tungsten-arc, inert gas (TIG) welding using a programmable industrial robot.

In fusion welding, metals are heated to a temperature at which they melt and are then joined together. Typically, the joint between the metals is formed using a filler metal in the form of a rod or wire. In arc welding, an electric arc is used to melt the metals of interest and the filler metal. Shielded-arc welding is based on the principle of protecting the molten filler metal from atmospheric contamination. In TIG welding, the electrode is protected by an envelope of chemically inert gas, as is shown in the schematic diagram of FIG. 1.

Various automated welding processes have been developed which employ industrial robots. These systems have been developed with feedback control mechanisms which indicate or sense the quality of the weld being made and the position of the welding torch (which is coupled to the robot arm) in relation to the article or articles to be welded.

While feedback control mechanisms have developed to a suitable level for many applications, there is a need for mechanisms and systems which provide for additional control of the welding process, and specifically for control of the welding torch.

As can be seen by reference to FIG. 1, control of the current passing through the tungsten electrode is important to control of the TIG welding process. Sufficient current must be provided to the electrode to create an arc in order to cause the filler wire and workpiece to melt. In addition, certain current levels must be maintained to ensure a uniform melt rate. Further still, current must be turned off when a weld is completed. Thus, a need has developed for an automated arc-welding system that provides more complete and specific control of the electrode current.

Programmable robots used to carry out tasks such as welding use relatively sophisticated computer hardware and software to control the robot and perform high precision, repetitive tasks. Present welding software enables robots to turn on a welding torch, guide the lit torch along a predetermined path, and then turn the torch off. Presently, welding software may be written in a computer language known as RAPID. RAPID software allows operators to select various instructions which correspond to the type of movement desired. Among the instructions available in the RAPID language are the following:

ARCL: This instruction refers to arc welding type welds which are completed in a linear direction. The instruction is used to define weld starts and stops.

ARCC: This instruction refers to arc welding type welds which are completed in a circular direction. To program a circular or curved path, the ARCL instruction is used to select the start point, then the ARCC instruction is used to input arc (i.e. curve) references. The ARCC instruction permits movements to be controlled in half circles.

However, in TIG welding, it is preferred that the welding current in the welding torch be adjusted so that current levels can be ramped up and down as needed. This can be readily accomplished when such welding is done by hand, but suitable welding current control has not yet been achieved in automated systems.

OBJECTS AND SUMMARY OF THE INVENTION

Therefore, it is an object of the present invention to provide a robot control system capable of controlling the current to a current-controlled tool mounted on a robot arm.

A further object of the present invention to is provide a robot control system that provides more complete and specific control of the electrode current in a welding torch.

A further object of the present invention is to provide a robot control system that provides ramping and pulsing control of the electrode current in a welding torch.

These and other objects are achieved in a robot control system that includes a controller, such as a computer, which is capable of accepting operator inputs. An industrial robot is coupled in data communication to the controller. The robot includes a robot arm and a tool such as a welding torch mounted thereon. The tool is controlled in at least one manner by electric current.

The controller is coupled in data communication to a current source and is programmed to control the current supplied to the tool on the robot arm. The programmed controller is capable of receiving inputs from an operator and is capable of ramping the current supplied to the tool from an initial current level to an operator selected current level over an operator defined and inputted selected time. The controller can also ramp the current supplied to the tool from the selected current level to a third, lower current level over a second operator selected and inputted time period. The system also allows an operator to pulse the current supplied to the electrode and to control the rate at which the filler wire is supplied to the welding torch.

Further objects and advantages of the present invention will become more apparent from the following detailed description of the invention taken in combination with the accompanying drawings.

DETAILED DESCRIPTION OF THE INVENTION

Figure 2:
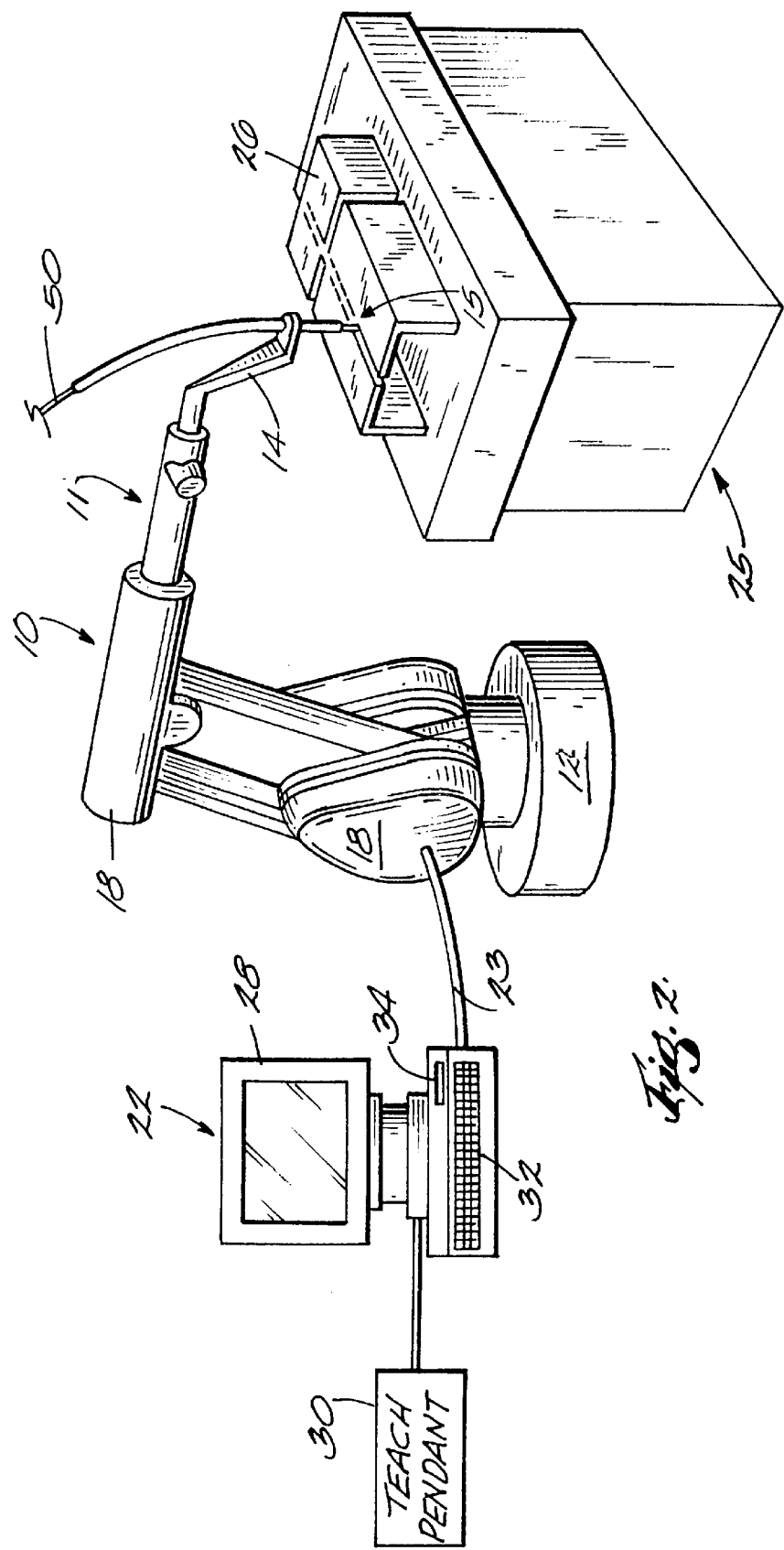
FIG. 2 is a perspective view of a robot control system including a controller and a robot.

Referring now to FIG. 2, there is shown an articulated arm robot 10 having an arm 11 and a base 12. At one end of the arm 11 is a TIG welding torch 14 having an electrode 15. The arm 10 includes a sufficient number of segments 23, pivotally connected together by a sufficient number of pivotable connections, to permit the torch 14 to have six degrees of freedom of movement. Using feedback mechanisms, such as transducers (not shown), the relative angle between adjacent segments is measured. The transducers continuously send signals representing the angles to a data processing means or controller 22, which may be located in or otherwise connected, for example, by cable 23, in data communication to the robot 10. The controller 22 uses this angle information to arrive at the spatial location of the torch 14. The robot 10 may be installed at a fixed table installation 25 where a workpiece 26 may be welded.

Figure 1:
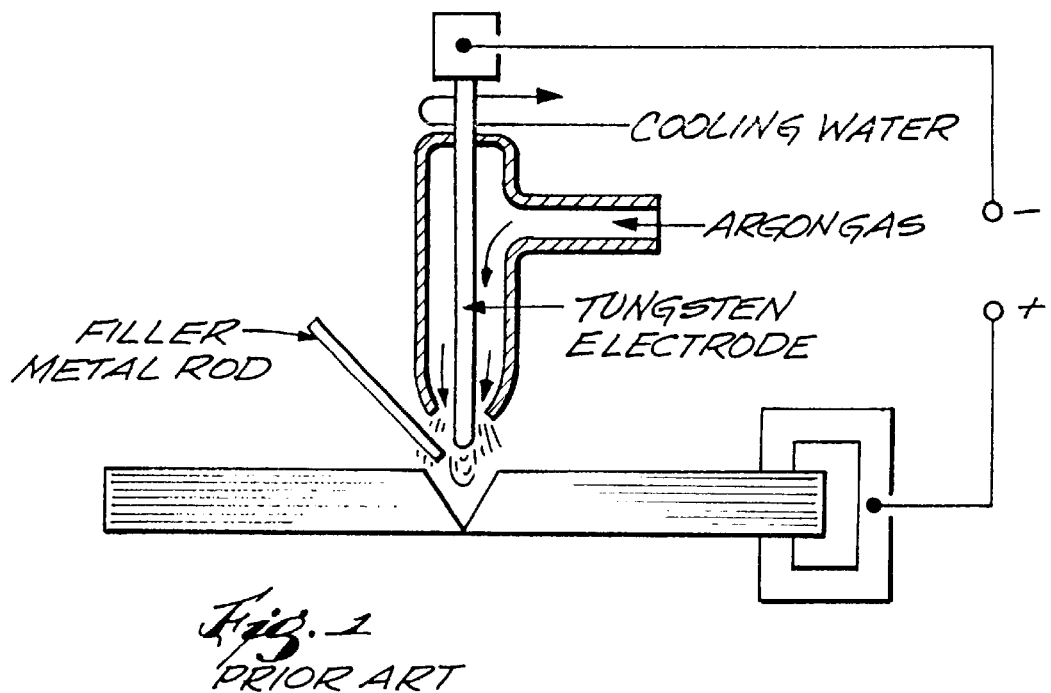
FIG. 1 is a schematic view of a TIG welding torch.
Figure 3:
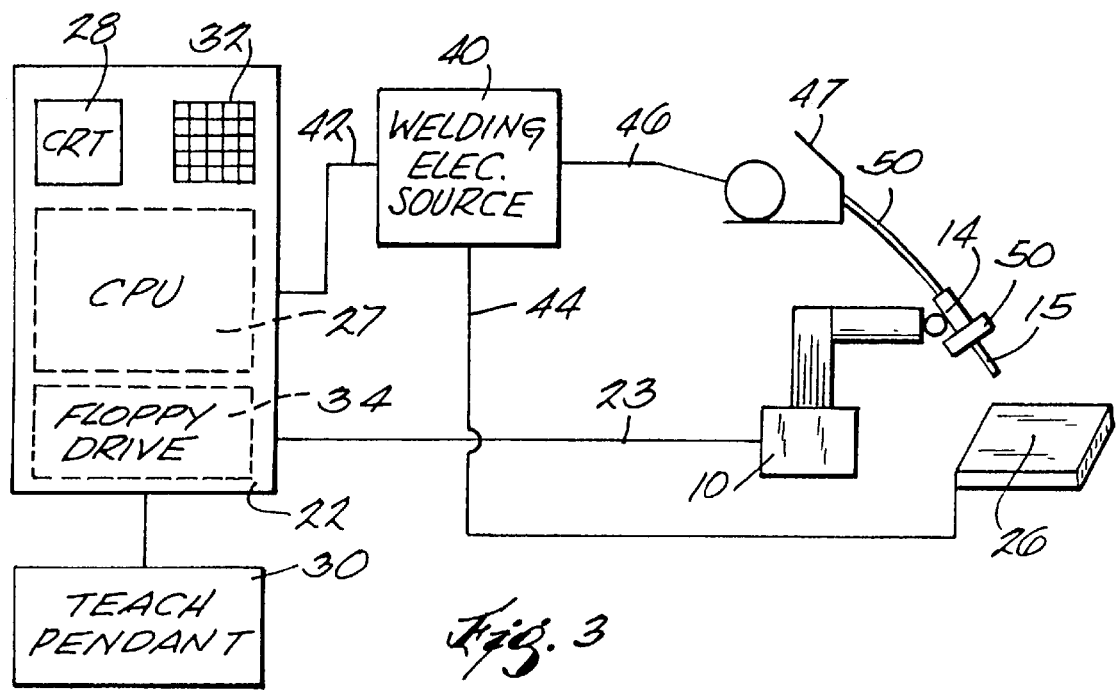
FIG. 3 is a schematic diagram of the robot control system of FIG. 2 and shows a welding feed reel and a current source.

As best seen by reference to FIGS. 2 and 3, the controller 22 may take the form of a programmable computer or other arrangement based upon a microprocessor. The controller 22 includes an internal central processing unit or data processor 27, a screen 28 on which a menu of information (e.g., a graphic user interface) may be displayed and selected from, and an input means such as a teach pendant 30, keyboard 32, or both. The controller 22 will generally include some means for storing information to a movable storage media, such as a floppy disk drive 34.

The controller 22 is coupled in data communication to an electric source 40 via a cable 42. The electric source 40 is coupled to the workpiece 26 through cable 44 and supplies current to the electrode 15 through cable 46. A welding feed reel 47 supplies a welding or filler wire 50 to the welding torch 16.

The controller may receive information from a feed back mechanism such as a through-the-arc seam tracker 50. The seam tracker 50 is designed to monitor a weld as it is made by the welding torch 16 and relays information regarding the weld to the controller 22 through a communication cable (not shown).

The robot 10 may be programmed to follow a predetermined path, such as a welding path, by loading an appropriate program into the controller 22. Such a welding program includes instructions describing the overall welding path, weld starts, stops, and other movements of the robot. Welding path programs may be created using a variety of methods and be written in a variety of computer programs. One method of creating an appropriate program is to write them in the language RAPID. More specifically, each of the instructions is designed to be used in connection with ARCWARE software. Some familiarity with the RAPID computer language and ARCWARE software is assumed in the discussion that follows. Background information on the RAPID language and ARCWARE software may be obtained from various commercial sources including ABB Flexible Automation, Inc., Fort Collins, Colo., and specifically by reference to the RAPID Reference Manual, Article No.: 3HB 5815-1, which is hereby incorporated by reference.

As noted, present welding software allows operators to select various instructions which correspond to types of movements. The present invention provides improved programming capability through new programming instructions. The first of these instructions is the TIGL instruction. This instruction is used to carry out TIG welding type welds which are completed in a linear direction. The instruction is used to control and monitor the entire TIG welding process by moving the tool center point (TCP) in a linear path to a specified destination. All phases, such as weld start, weld end, and ramping of the weld current are controlled, and the welding process is monitored continuously. A feed back mechanism such as a through the arc seam tracker may be used to monitor the welding process. The TIGL instruction includes many arguments and may be defined as follows:

TIGL [\On] [\Off] pToPoint nRampTime vTigSpeed [\nTime] smTigSeam wdTigWeld wvTigWeave zTigZone [\nZone] tTigTool [\obTigWobj].

Each of the listed arguments may be defined as follows.

[\On] Data type: switch

This optional argument is normally used in the first instruction of a tig weld. It turns on the tig welder and if the nRampTime argument is greater than zero, it ramps the weld current up to a specified value as described below in the wdTigWeld argument.

[\Off] Data type: switch

This optional argument is used to finish a weld and turn off the tig welder. If the TigL\Off nRampTime argument is greater than zero, TigL\Off ramps the weld current down to a specified value as described below further in the smTigSeam argument.

pToPoint Data type:robtarget

The destination point of the robot and external axes, either defined as a named position (robtarget) or stored directly in the instruction.

nRampTime Data type:num

This argument controls the duration (time in seconds) of the weld current ramp, either a ramp up if TigL\On is used, or a ramp down if TigL\Off is used. If zero is entered in the argument, there will be no weld current ramp.

vTigSpeed Data type:speeddata vTigSpeed controls the speed of the TCP when the robot tool, i.e. the welding torch, is not welding or moving point to point through TIG welding type welds.

[\nTime] Data type:num nTime is used to specify the total time of movement in seconds directly in the TigL instruction.

smTigSeam Data type:seamdata smTigSeam describes the start and end phases of the tig welding process.

When the TigL\On instruction is used, the starting value of the weld current up ramp is entered in seam data component: ign_voltage. When the TigL\Off instruction is used, the seam data component fill_voltage value is used as the ending value of the weld current down ramp.

wdTigWeld Data type:welddata wdTigWeld describes the weld phase of the tig welding process. When the TigL\On instruction is used, the weld current is ramped up after ignition, from the initial value entered in the seamdata argument (ign_voltage) to the main welding current value which is entered in the welddata component: weld_voltage. When the TigL\Off instruction is used, the weld current is ramped down, from the main welding current value which is entered in the welddata component: weld_voltage, to the final current value which is entered in the seamdata component: fill_voltage.

wvTigWeave Data type:weavedata wdTigWeave describes the weaving that will take place during the welding phase.

zTigZone Data type:zonedata wdTigZone defines in millimeters how close the axes must be to the programmed position before they can start moving towards the next position.

Weld data changes over to the next welding instruction at the center point of the corner path (if not delayed by the delay_distance component in the wdTigWeld argument).

[\nZone] Data type:num

This argument is used to specify the positional accuracy of the robot's TCP directly in the TigL instruction. The size of the zone is specified in millimeters and is substituted in the corresponding zone specified in zTigZone. The \nZone argument is useful when trimming individual corner paths.

tTigTool Data type:tooldata tTigTool is used in the robot's movements. The TCP of the tool is the point moved to the specified destination position (pToPoint).

[\obTigWobj] Data type:wobjdata

The work object (coordinate system) that the robot's movements are referenced to is specified in the obTigWobj. When this argument is omitted, the robot position is referenced to the world coordinate system. This argument must be specified if a stationary TCP or coordinated external axes are used.

An example of appropriate code for carrying out a linear TIG weld is as shown below.

PERS welddata wdTig1:=[10,150,30,0,0,150,18];
PERS welddata wdTig2:=[8,100,12,0,0,0,0];
PERS seamdata smTig1:=[1,0.5,50,0,0,0,0,0,0,0,0,0,1,50,0];
PERS weavedata NoWeave:=[0,0,0,0,0,0,0,0,0,0,0,0,0,0];
PERS weavedata wvTig1:=[1,0,0.1,0.1,0,0,0,0,0,0,0,0,0,0];
MoveJ. . .
TigL\On,p 1,3,v300,smTig1,wdTig1,NoWeave,fine, tWeldGun\obTigWobj:=wobjside1;
TigLp2,0,v300, smTig1,wdTigL1,NoWeave,fine, tWeldGun\obTig Wobj:=wobjside1;
TigLp3,0,v300,smTigL1,wdTig2,wvTigL1,fine, tWeldGun\obTigWobj:=wobjside1;
TigL\Off,p4,2,v800,smTigL1,wdTig1,NoWeave,fine, tWeldGun\obTigWobj:=wobjside1;

In the example, the robot executes a joint move moving the torch or welder to a pre-weld position. A joint move is a linear movement by the robot to a desired point where the quickest path in each axis is followed to reach the point. The robot then moves the welder to the starting position of the weld, p1, at a speed of v300 (or 300 mm/s). At p1 the gas solenoid and the TIG welding gun are turned on. The starting value of the weld current is 50 amps as entered in the smTigL1 ign_voltage component. When the TIG arc is established, the TIG weld current is ramped up to 150 amps (as specified in the wdTig 1 weld_voltage component) in 3 seconds. Ramping up the current is accomplished in a series of discrete steps. A change is made every 100 ms and the amplitude of the change is based on the time of the ramp and the difference between the ignition voltage and the weld voltage. The stepping up of the voltage (and, therefore, the current) approximates a straight line ramp. (See FIG. 4) The ramping up of the current in discrete steps is refered to as step-wise ramping. After the current is ramped up, the welding feed reel is then turned on, and the robot moves the welder to p2.

At p2 the weld current is changed (no ramp) to 100 amps (as specified in the wdTig2 weld_voltage component) and the robot begins weaving as specified in wvTigL1 and moves to p3. At p3 the weld current is changed (no ramp) to 150 amps (as specified in the wdTigL1 weld_voltage component), weaving is stopped, and the robot moves the torch to p4. At p4 the wire feeder is turned off, the weld current is ramped down to 50 amps (as specified in the smTigL1 fill_voltage component) in 2 seconds, and the welder is turned off. Ramping down occurs in a similar fashion as ramping up, except the amplitude of each decreasing step is based on the time of the ramp and the difference between the weld voltage and the fill or ending voltage.

So that welds may be performed along curved paths, the present invention provides a second instruction, TIGC. The TIGC instruction is used to weld along a circular path. Using the TIGC instruction the TCP may be moved in a circle to a specified destination. All phases, such as weld start, weld end, and ramping of the weld current are controllable, and the welding process is monitored continuously. The instruction may be defined as follows:

TigC[\On] | [\Off] pCirclePt pToPoint nRampTime vTigSpeed [\nTime] smTigseam wdTigWeld wvTigWeave zTigZone [\nZone] tTigTool [\obTigwobj].

The arguments in the instruction are defined as follows:

[\On] Data type:switch
This optional argument \On is normally used in the first instruction of a tig weld.
It turns on the tig welder and if the nRampTime argument is greater than zero, it ramps the weld current up to a specified value as described below in the wdTigWeld argument.

[\Off] Data type: switch
This optional argument \Off is used to finish a weld and turn off the tig welder. If the TigC\Off nRampTime argument is greater than zero, TigC\Off ramps the weld current down to a specified value as described below in the smTigSeam argument.

pCirclePt Data type:robtarget
The circle point is a radius position on the circle between the start point and the destination point of the robot and external axes. To obtain the best accuracy, this point should be about halfway between the start and the destination points. If chosen to close to the start point or destination point, the robot may give a warning. The circle point is defined as a named position or stored directly in the instruction (marked with an * in the instruction).

pToPoint Data type:robtarget
This is the destination point of the robot and external axes, and is either defined as a named position (robtarget) or stored directly in the instruction.

nRampTime Data type:num
This argument controls the duration (time in seconds) of the weld current ramp, either a ramp up if TigC\On is used, or a ramp down if TigC\Off is used. If zero is entered in the argument, there will be no weld current ramp.

vTigSpeed Data type:speeddata
vTigSpeed controls the speed of the TCP when the welder or torch is not welding or moving point to point through welding positions.

[\nTime] Data type:num
nTime is used to specify the total time of movement in seconds directly in the TigC instruction.

smTigSeam Data type:seamdata
smTigSeam describes the start and end phases of the tig welding process. When the TigC\On instruction is used, the starting value of the weld current up ramp is entered in seam data component: ign_voltage. When the TigC\Off instruction is used, the seam data component fill_voltage value is used as the ending value of the weld current down ramp.

wdTigWeld Data type:welddata
wdTigWeld describes the weld phase of the tig welding process. When the TigC\On instruction is used, the weld current is ramped up after ignition, from the initial value entered in the seamdata argument (ign_voltage) to the main welding current value which is entered in the welddata component: weld-voltage. When the TigC\Off instruction is used, the weld current is ramped down, from the main welding current value which is entered in the welddata component: weld_voltage, to the final current value which is entered in the seamdata component: fill_voltage.

wvTigWeave Data type:weavedata
  wdTigWeave describes the weaving that will take place during the welding phase.
zTigZone Data type:zonedata
  wdTigZone defines in millimeters how close the axes must be to the programmed position before they can start moving towards the next position. Weld data changes over to the next welding instruction at the center point of the corner path (if not delayed by the delay_distance component in the wdTigWeld argument).
[\nZone] Datatype:num
  This argument is used to specify the positional accuracy of the robot's TCP directly in the TigC instruction. The size of the zone is specified in millimeters and is thus substituted in the corresponding zone specified in zTig-Zone. The \nZone argument is useful when trimming individual corner paths.
tTigTool Data type:tooldata
  tTigTool is used in the robot's movements. The TCP of the tool is the point moved to the specified destination position (pToPoint).
[\obTigWobj] Data type:wobjdata
  The work object (coordinate system) that the robot's movements are referenced to is specified in the obTig-Wobj. When this argument is omitted, the robot position is referenced to the world coordinate system. This argument must be specified if a stationary TCP or coordinated external axes are used.

An example of appropriate code for carrying out a curved TIG weld is shown below.
  PERS welddata WdTigL:=[10,150,30,0,0,150,18];
  PERS welddata wdTig2:=[8,100,12,0,0,0,0];
  PERS seamdata smTig1:=[1,0.5,50,0,0,0,0,0,0,0,0,0,1,50,0,];
  PERS weavedata NoWeave:=[0,0,0,0,0,0,0,0,0,0,0,0];
  PERS weavedata wvTig1:=[1,0,0.1,0.1,0,0,0,0,0,0,0,0,0];
  MoveJ. . .
  TigL\On,p1,3,v300,smTig1,wdTig1,NoWeave,fine, tWeldGun\obTigWobj:=wobjside 1;
  TigC p2,p3,0,v300,smTig1,wdTig1,NoWeave,fine, tWeldGun\obTigWobj:=wobjside;
  TigC\Off,p4 ,p5,2,v800,smTig1,wdTig1,wvTig1, NoWeave, fine,tWeldGun\obTigWobj:=wobjside;

In this example, the robot executes a joint move to a pre-weld position. It then moves to the starting position of the weld, p1, at a speed of v300. At p1 the gas solenoid and the welding torch are turned on. The starting value of weld current is 50 amps as entered in the smTigL1 ign_voltage component. When the tig arc is established, tig weld current is ramped up to 150 amps (as specified in the wdTigL1 weld_voltage component) in 3 seconds. The welding feed reel is then turned on, and the robot moves in an arc from p1 to p3 via circle point p2.

At p3 the weld current is changed (no ramp) to 100 amps (as specified in the wdTig2 weld_voltage component) and the robot begins weaving as specified in wvTigL1 and moves in an arc from p3 to p5 via circle point p4 . At p5 the wire feeder is turned off, the weld current is ramped down to 50 amps (as specified in the smTigL1 fill_voltage component) in 2 seconds and then the welder is turned off.

Figure 5:
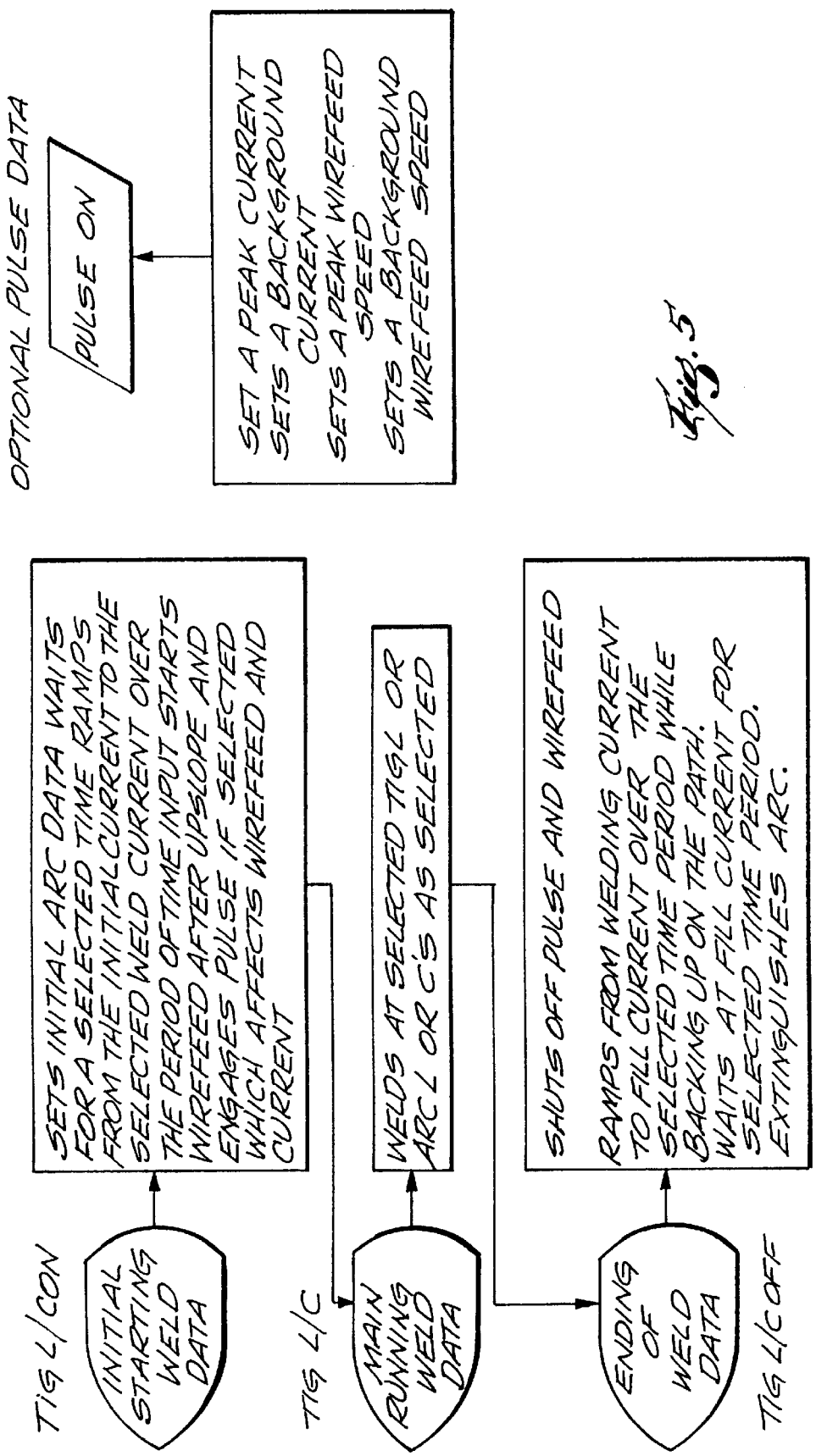
FIG. 5 is a flow chart of the software used in the robot control system of the present invention.
Figure 6:
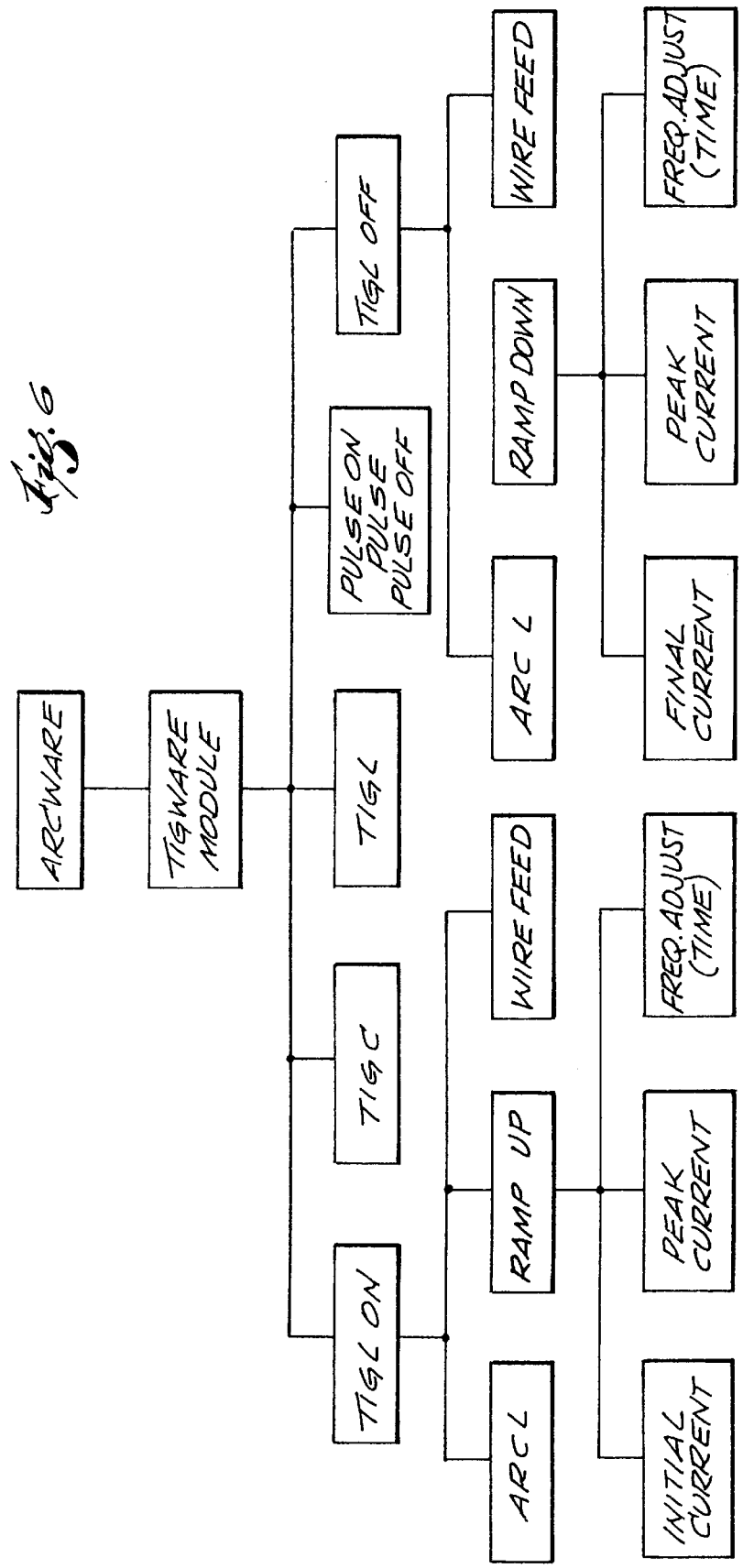
FIG. 6 is a simplified, schematic flow chart showing the structure of the software used in the robot control system of the present invention.

The TIGL and TIGC instructions make internal calls to existing instructions ARCL and ARCC, respectively. When calling these latter instructions, TIGL and TIGC pass on all received arguments and, therefore, each has all the associated features of ARCWARE software such as weld and weave tuning, wire jogging, weld and weave blocking, weld restart, and fault management. The TIGL and TIGC instructions are considered to be a part of a software module which the inventors have named TIGWARE. The code for the TIGWARE module is set out in the attached program listing in Exhibit A and may be understood by reference to FIGS. 4, 5, and 6.

The TIGWARE module provides for pulsing of the current supplied to the electrode through the PulseOn, Pulse, and PulseOff procedures which are set out in pages 2–4 in the attached program listing. These three procedures also provide for control over the rate at which the filler wire is provided to the welding torch 14.

Figure 4:
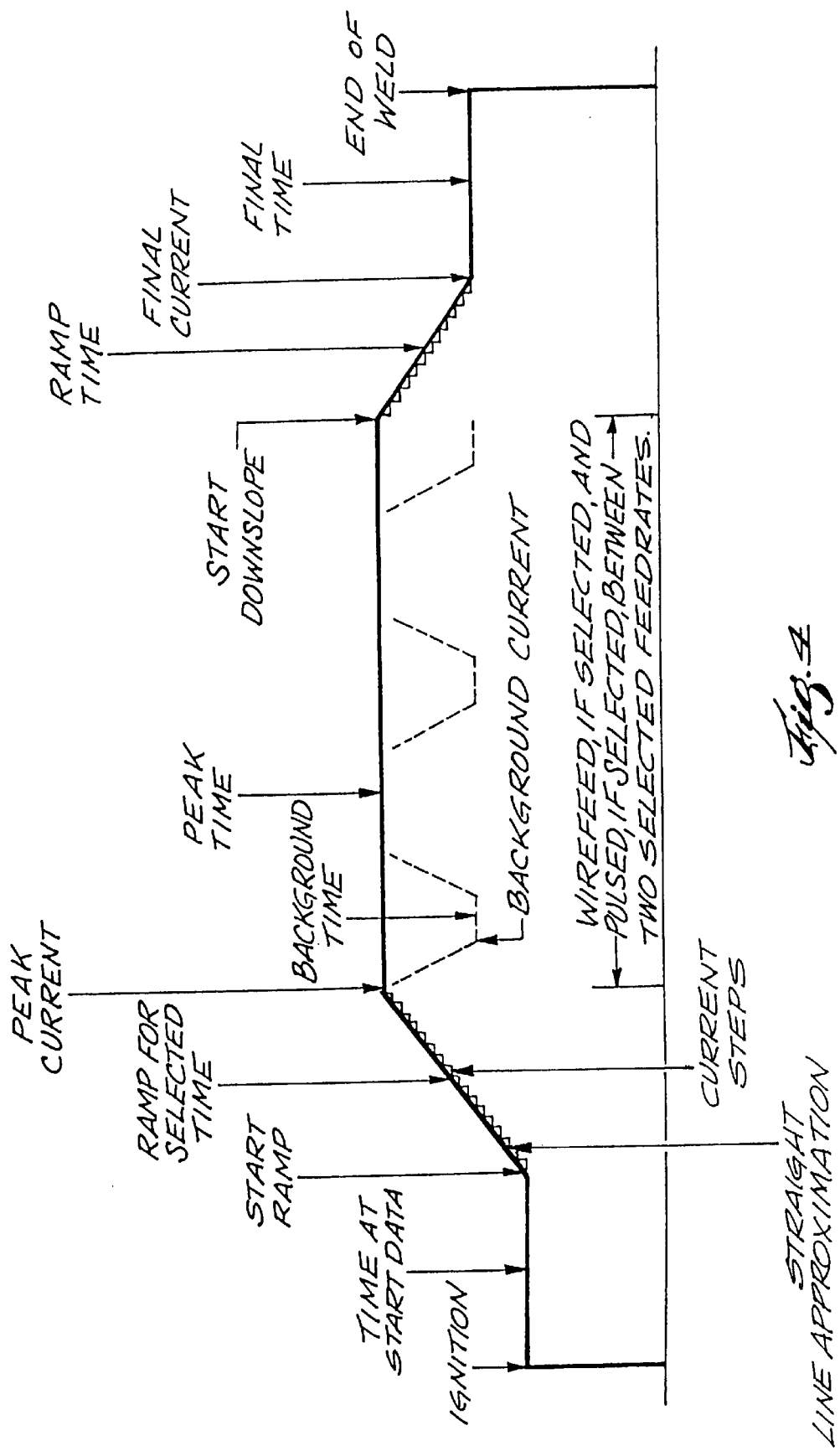
FIG. 4 is schematic diagram showing current ramping carried out by the robot control system of the present invention.

As best seen in FIG. 4, the amplitude of the current supplied to the electrode may be varied, if desired, in order to carry out specific types of TIG welds. The current may be supplied as a square wave or other periodic wave. The amplitude may be varied from a background current level to a peak level, and if desired the rate at which the filler wire is fed to the welding torch 14 may be adjusted to correspond to the current pulsing, with a high feed rate being used at high current amplitude and a low current rate at a low current amplitude.

While the present invention has been described in what is believed to be the most preferred form, it is to be understood that the invention is not confined to the particular construction and arrangement of the components herein illustrated and described, but embraces such modified forms thereof as come within the scope of the following claims. In particular, the scope of the present invention is not intended to be limited to welding applications. Various other uses of the present invention may be made in plasma welding, plasma cutting, oxy-fuel cutting, laser cutting, laser welding, painting, sanding, cleaning, assembling, and other actions where ramping and control of current is useful. Specifically, for example, instructions could be developed using the RAPID software language and implemented in the present invention to program a desired painting path using current to control the operation of a painting gun.

What is claimed is:

1. A robotic system for use by an operator, the system comprising:
  a controller capable of accepting operator inputs and having means for storing a program and a program, the program containing a programmed path with a number of predetermined positions;
  a robot coupled in data communication to the controller, the robot including a robot arm and a current-controlled tool mounted thereon, the robot for moving the current controlled tool along the programmed path; and
  an electric current source coupled in data communication to the controller and capable of supplying an electric current to the current-controlled tool;
  the controller including
  means for controlling the electric current source, the means capable of ramping current supplied to the current-controlled tool in a step-wise fashion from an initial current level to an operator selected current level over an operator selected time;
  means for controlling the speed of the current-controlled tool as it moves from one position to another along the programmed path;
  means for controlling the total time the current-controlled tool is in motion while traveling along the programmed path; and means for controlling the positional accuracy of the current-controlled tool with respect to the desired positions of the programmed path.

2. A robotic system as claimed in claim 1, wherein the means for controlling the electric current source is capable of causing the current supplied to the current-controlled tool to ramp down from the selected current level to a third current level over a second operator selected time period in a step-wise fashion.

3. A robotic system as claimed in claim 1, wherein the current-controlled tool is a welding torch.

4. A robotic system as claimed in claim 3, wherein the means for controlling the current source is capable of pulsing the amplitude of the current supplied to the current controlled tool.

5. A robotic control system as claimed in claim 3, wherein the welding torch is a TIG welding torch, the robot control system further comprising
   a welding feed reel including a filler wire; and
   means for controlling the speed of feeding the filler wire to the TIG welding torch.

6. A welding system for use by an operator, the welding system comprising:
   a controller capable of accepting operator inputs and having means for storing a program and a program, the program containing a programmed path with a number of predetermined positions;
   a robot coupled in data communication to the controller, the robot including a robot arm and a welding torch mounted thereto and for moving the welding torch along the programmed path, the welding torch including an electrode; and
   an electric current source coupled in data communication to the controller and capable of supplying an electric current to the electrode;
   the controller including
   means for controlling the electric current source, said means capable of ramping up the current supplied to the electrode from an initial current level to an operator selected current level over an operator selected time, said operator selected time input to said controller by the operator, and capable of ramping the current supplied to the electrode down from the selected current level to a third current level over a second operator selected time period, said second operator selected time input to said controller by the operator;
   means for controlling the speed of the welding torch as it moves from one position to another along the programmed path;
   means for controlling the total time the welding torch is in motion while traveling along the programmed path; and
   means for controlling the positional accuracy of the welding torch with respect to the desired positions of the programmed path.

7. A welding system as claimed in claim 6, wherein the means for controlling the current source is capable of pulsing the current supplied to the welding torch.

8. A welding system as claimed in claim 7, wherein the welding torch is a TIG welding torch, the control system further comprising
   a welding feed reel including a filler wire; and
   a means for controlling the speed of feeding the filler wire to the TIG welding torch.

9. A robotic system for use by an operator, the system comprising:
   a controller capable of accepting operator inputs and having means for storing a program and a program, the program containing a programmed path with a number of predetermined positions;
   a robot coupled in data communication to the controller, the robot including a robot arm and a current-controlled tool mounted thereon and for moving the current-controlled tool along the programmed path; and
   an electric current source coupled in data communication to the controller and capable of supplying an electric current to the current-controlled tool;
   the controller including
   means for controlling the electric current source, the means capable of ramping up the current supplied to the current-controlled tool in a series of discrete steps, each step having an equal time, the current being ramped up between an initial current level to an operator selected current level over an operator selected time;
   means for controlling the speed of the current-controlled tool as it moves from one position to another along the programmed path;
   means for controlling the total time the current-controlled tool is in motion while traveling along the programmed path; and
   means for controlling the positional accuracy of the current-controlled tool with respect to the desired positions of the programmed path.

10. A robotic system as claimed in claim 9, wherein the means for controlling the electric current source is capable of causing the current supplied to the current-controlled tool to ramp down in a series of discrete steps, each step having an equal time, between the selected current level to a third current level over a second operator selected time period.

11. A robotic system as claimed in claim 10, wherein the means for controlling the current source is capable of pulsing the amplitude of the current supplied to the current controlled tool.

12. A robot control system for use by an operator and to control a robot with an arm, the system comprising:
   a controller capable of accepting operator inputs;
   a welding tool capable of being mounted on the robot arm and coupled in data communication with the controller;
   an electric current source coupled in data communication to the controller and capable of supplying an electric current to the welding tool;
   means for controlling the electric current source, the means capable of ramping current supplied to the welding tool in a step-wise fashion from an initial current level to an operator selected current level over an operator selected time and pulsing the amplitude of the current supplied to the welding tool; and
   means for adjusting the feed rate at which a filler wire is supplied to the welding tool so that the feed rate of the filler wire corresponds to the amplitude of the pulsed current supplied to the welding tool.

13. A robot control system for use by an operator and to control a robot with an arm, the system comprising:
   a controller for accepting operator inputs and having a means for storing a programmed path and a programmed path; the programmed path having a number of predetermined positions;
   a welding tool capable of being mounted on the arm and coupled in data communication to the controller;

an electric current source coupled in data communication to the controller and for supplying an electric current to the welding tool; and means for controlling the electric current source, the means capable of ramping current supplied to the current-controlled tool in a step-wise fashion from an initial current level to a first operator selected current level over an operator selected time and ramping the current supplied to the current-controlled tool in a step-wise fashion down from the first operator selected current level to a second current level over a second operator selected time;

means for controlling the speed of the welding tool as it moves from one position to another along the programmed path;

means for controlling the total time the welding tool is in motion while traveling along the programmed path;

means for controlling the positional accuracy of the welding tool with respect to the desired positions recorded in the programmed path; and means for controlling the weave pattern of the welding tool while the welding tool is welding.

* * * * *